(No Model.)
C. S. HENSLEY.
SLAT AND WIRE FENCE MAKING MACHINE.
No. 533,460. Patented Feb. 5, 1895.
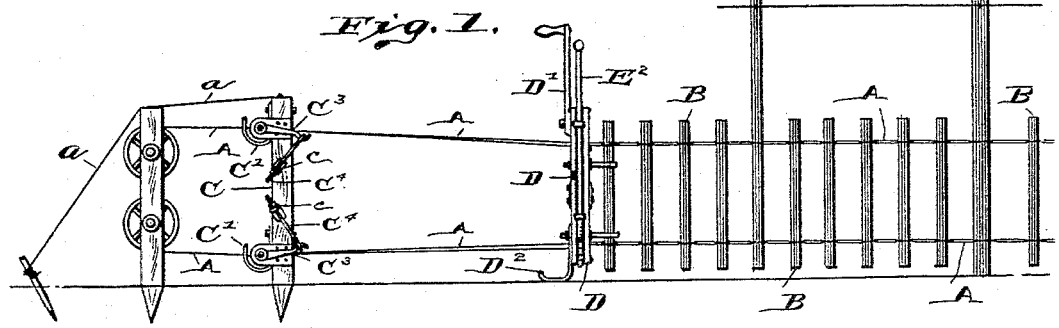
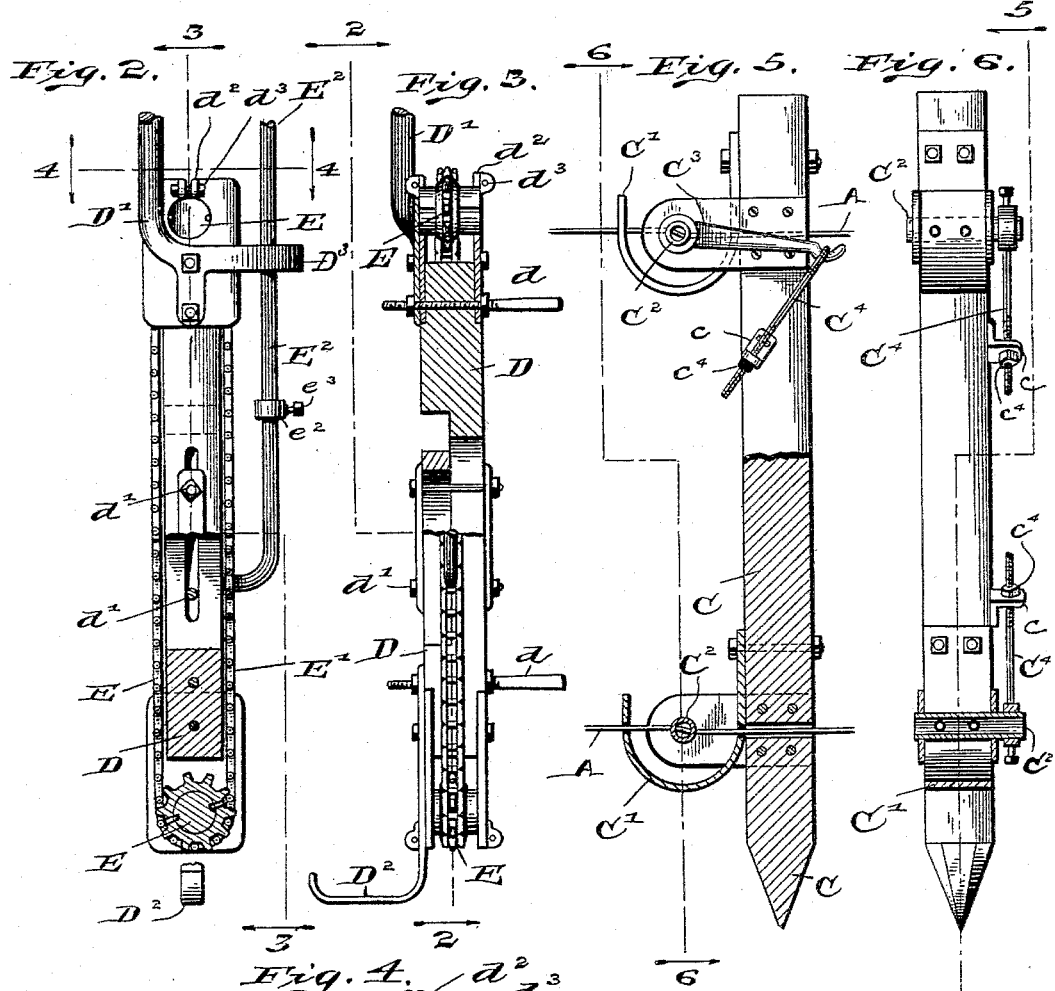
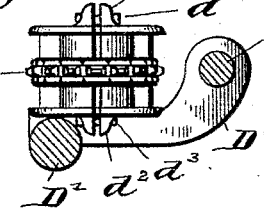
WITNESSES:
INVENTOR
Charles S. Hensley,
BY
Chester I. Bradford,
ATTORNEY.
THE NORRIS PETERS CO., PHOTO-LITHO., WASHINGTON, D. C.

UNITED STATES PATENT OFFICE.

CHARLES S. HENSLEY, OF BARNARD, ASSIGNOR OF ONE-HALF TO TILLMAN P. PRATHER, OF ROACHDALE, INDIANA.

SLAT-AND-WIRE-FENCE-MAKING MACHINE.

SPECIFICATION forming part of Letters Patent No. 533,460, dated February 5, 1895.

Application filed June 2, 1894. Serial No. 513,308. (No model.)

*To all whom it may concern:*

Be it known that I, CHARLES S. HENSLEY, a citizen of the United States, residing at Barnard, in the county of Putnam and State of Indiana, have invented certain new and useful Improvements in Fence-Making Machines, of which the following is a specification.

The object of my said invention is to produce a simple and inexpensive device for weaving fences from wire and slats; and includes a tension device for the wire and mechanism for twisting the wire between the slats.

A machine embodying my said improvements will be first fully described and the novel features thereof then pointed out in the claims.

Referring to the accompanying drawings, which are made a part hereof, and on which similar letters of reference indicate similar parts, Figure 1 is a side elevation of a fragment of fence in process of being built by the aid of my machine; Fig. 2, a view partially in section and partially in elevation of the twisting mechanism, on a larger scale, as seen from the dotted line 2—2 in Fig. 3; Fig. 3, a similar view as seen from the dotted line 3—3 in Fig. 2; Fig. 4, a top plan of the twisting mechanism as seen from the dotted line 4—4 in Fig. 2; and Figs. 5 and 6, views of the tension device, showing its construction more plainly, as seen from the dotted lines 5—5 and 6—6.

In said drawings the portions marked A represent the fence wires; B, the fence slats; C, the main portion of the tension device; D, the frame of the wire twisting machine, and E the twisting wheels.

The wires A and slats B are such as are commonly used in building fences of this character, and need no special description. The fence shown is one where the slats are short, and extend only a part of the height of the fence, while the wires alone form the upper part. By this construction a fence is secured which is closely made at the bottom to prevent the passage of small animals and fowls, while the upper portion is designed to prevent the passage of larger animals only. A fence thus constructed is more economical than where the slats are long enough to extend the whole height of the fence. In building such a fence the usual posts are employed, and an occasional long slat is woven in, as shown at B', and around the upwardly projecting ends of these long slats the upper wires (only fragmentarily shown) are secured.

The tension device consists of the frame C, wings C' on said frame, and rock-shafts $C^2$ mounted in suitable bearings secured to said frame, and through all of said parts holes are formed through which the wires A pass. The rock-shafts $C^2$ are preferably formed of tubing, and each has, upon its outer end, a lever $C^3$ by which it may be turned, and connected to the end of this lever is a link $C^4$, which engages with an ear $c$ on the frame-work, and having a nut $c^4$ by which it may be adjusted. Obviously, the rock-shaft may be turned or rocked slightly by turning said nut, and thus the exact tension on the wire desired may be secured, as the wire will bind more or less, (see Fig. 5,) in passing through the holes in said rock-shaft, as said holes are forced to depart from a direct line co-incident with the direction of the wire. The tension device as a whole is strongly secured in place, (by stay-wires $a$ or otherwise) and the wire is drawn through it sufficiently to compensate for what is taken up in the twisting.

The frame D of the twisting apparatus is of suitable form for the purposes shown, and is provided with a handle D' and a foot-piece $D^2$, by which the operator is enabled to push it toward and from the slats, and to hold it firmly in place while the twisting operation is being performed. Projecting out from the front edge of this frame-piece are forks or fingers $d$, which come in contact with the slats being woven into the fence, and the stems of which also serve as bolts to assist in uniting the various parts of the structure. Said frame D is composed of two parts, as shown most plainly in Fig. 3, which overlap each other, and are secured together by bolts $d'$ passing through slots in the overlapping parts. By loosening said bolts the parts can be slipped endwise on each other, and the frame thus shortened so that the chain may be removed. In the ends of this frame are appropriate bearings for the wheels E, and leading out from said bearings to the ends are slots through which the wires may pass and enter the notches in the edges of said wheels. In order to prevent the wires from escaping through these slots in operation, suitable retaining devices are provided which may cross or obstruct said slots after the wires are in place.

In the drawings I have shown small ears $d^2$ through which pins $d^3$ pass transversely of the slots, and in position to form a continuation of the boundaries of the bearings for the wheels, so that when the pins are in place, said boundaries, against which the wire might be thrown in revolving the wheels, are smooth, as though there were no slots leading out therefrom. Any device which would close the slots, or prevent the wire from entering them, would, of course, be the equivalent of these pins,—that being their only office.

The wheels E are mounted in appropriate bearings in the frame D, near the ends of said frame, and are adapted to revolve in said bearings. Each wheel is provided with two notches to receive the wires, and through which they pass, as above set forth. The peripheries of said wheels are formed as sprocket wheels, and they are connected together by a chain belt E' by which they are simultaneously revolved. Secured to said chain belt is a handle $E^2$ by which it is forced up and down, in revolving the wheels. I limit the movement of this handle, and thus determine the extent of the twisting of the wire by placing collars $e^2$ on the shank of said handle which may be secured in place by set screws $e^3$, and may be adjusted to any point thereon; and these will come in contact, respectively, with the top and bottom sides of the eye $D^3$ through which the shank of said handle E passes and by which it is guided.

In operation the twisting device is placed in position, with the forks $d$ against the slat to be twisted into the fence, and the operator holds the twisting mechanism in place by means of the handle D' and the foot-piece $D^2$. Then, by means of the handle $E^2$, he pushes or pulls on the chain E', and thus revolves the wheel E and pushes the wire in front of the slat. The apparatus is then moved the proper distance, another slat inserted, and the operation repeated, and so on until the fence is built. After the lower portion of the fence is built, the wires forming the upper portion are stretched and suitably connected to the long slats, which are placed at intervals, as above described.

When it is desired to remove the machine from the wires, as when passing from one side to another of a corner or other post, the machine may be conveniently taken off, by loosening the bolts which unite the two parts of the frame, sliding said two parts upon each other, and slackening the chain so that it may be lifted off the wheels, unhooking a link of the chain and removing said chain altogether, (said chain being formed of detachable links,) and also displacing the devices ($d^3$) which prevent the removal of the wires through the slots, when said wires can be removed, and the machine is thus wholly detached, and may be re-attached on the other side of the post or otherwise as may be desired.

Having thus fully described my said invention, what I claim as new, and desire to secure by Letters Patent, is—

1. The combination of the frame D having forks $d$, a handle D', and foot-piece $D^2$, the wheels E having holes to receive the wire, and sprockets on their peripheries, the chain belt E' connecting said wheels, and a pitman-like handle $E^2$ connected directly to said chain for operating the same, with a guiding bearing $D^3$ for said handle, all substantially as shown and described.

2. The combination, in a fence-making machine, of the wire twisting mechanism, a handle for operating the same, an eye or guide through which the shank of said handle passes, and adjustable stops secured to said handle shank whereby the distance of the travel may be variably determined, substantially as set forth.

3. The combination, in a fence-making machine, with the wire-twisting apparatus, of a tension apparatus consisting of a frame, a separate horizontal rock-shaft for each pair of wires mounted in bearings on said frame and having perforations through which the wires extend, and means for operating each rock-shaft, whereby a greater or less bending tension is applied to said wire as the perforations are positioned to diverge from or approach to the normal position of said wire, substantially as shown and described.

4. The combination, in a fence building machine, with the wire twisting apparatus, of a wire tension device consisting of the frame C, the rock-shafts $C^2$ therein, levers $C^3$, and adjustable connections $C^4$, whereby said rock-shafts may be adjusted, substantially as set forth.

In witness whereof I have hereunto set my hand and seal, at Indianapolis, Indiana, this 29th day of May, A. D. 1894.

CHARLES S. HENSLEY. [L. S.]

Witnesses:
CHESTER BRADFORD,
JAMES A. WALSH.